US012466056B2

(12) United States Patent
Adams

(10) Patent No.: US 12,466,056 B2
(45) Date of Patent: Nov. 11, 2025

(54) MODULAR STORAGE UNIT INCLUDING SUB-UNITS

(71) Applicant: Milwaukee Electric Tool Corporation, Brookfield, WI (US)

(72) Inventor: Caleb C. Adams, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 173 days.

(21) Appl. No.: 18/157,340

(22) Filed: Jan. 20, 2023

(65) Prior Publication Data

US 2023/0234211 A1 Jul. 27, 2023

Related U.S. Application Data

(63) Continuation of application No. PCT/US2023/060892, filed on Jan. 19, 2023.

(60) Provisional application No. 63/301,721, filed on Jan. 21, 2022.

(51) Int. Cl.
*B25H 3/02* (2006.01)
*B65D 51/00* (2006.01)

(52) U.S. Cl.
CPC ............. *B25H 3/028* (2013.01); *B25H 3/026* (2013.01); *B65D 51/00* (2013.01); *B65D 2555/02* (2013.01); *B65D 2590/0066* (2013.01)

(58) Field of Classification Search
CPC ........ A47B 88/00; B25H 3/026; B25H 3/028; B65D 51/00; B65D 2555/02; B65D 2590/0066
USPC ................................ 206/372–373; 312/330.1
See application file for complete search history.

(56) References Cited

U.S. PATENT DOCUMENTS

| | | | | |
|---|---|---|---|---|
| 1,500,398 | A | 7/1924 | Kusnetz | |
| 1,552,511 | A | 9/1925 | Secoy | |
| 1,763,724 | A | 6/1930 | Rosenthal | |
| 3,150,902 | A | 9/1964 | Naab et al. | |
| 3,424,334 | A | 1/1969 | Goltz | |
| 4,501,456 | A | 2/1985 | Schafer | |
| 4,775,199 | A * | 10/1988 | Lanius | B25H 3/028 312/220 |
| 4,871,217 | A | 10/1989 | Taylor et al. | |
| 5,207,781 | A | 5/1993 | Rock | |

(Continued)

FOREIGN PATENT DOCUMENTS

| | | | |
|---|---|---|---|
| CN | 2233305 | Y | 8/1996 |
| CN | 2641233 | Y | 9/2004 |

(Continued)

OTHER PUBLICATIONS

Inter Partes Review No. 2024-01400, "Petition for Inter Partes Review of U.S. Pat. No. 11,365,026" Filed Sep. 17, 2024, 147 pages.

(Continued)

*Primary Examiner* — Bryon P Gehman
(74) *Attorney, Agent, or Firm* — Reinhart Boerner Van Deuren s.c.

(57) ABSTRACT

Various embodiments of a storage device are provided. The storage device includes one or more storage compartment that are slidable with respect to sidewalls of the storage device. The containers are also rotatable with respect to the sidewalls of the storage device, thereby permitting improved accessibility to the storage compartment in the container.

19 Claims, 9 Drawing Sheets

(56) References Cited

U.S. PATENT DOCUMENTS

| | | | | |
|---|---|---|---|---|
| 5,516,203 | A | 5/1996 | Branham et al. | |
| 5,890,613 | A | 4/1999 | Williams | |
| 6,012,934 | A | 1/2000 | Aoki et al. | |
| 6,322,177 | B1 | 11/2001 | Vasudeva | |
| 6,347,848 | B1 | 2/2002 | Cho | |
| 6,742,854 | B2 * | 6/2004 | Chen | E05B 65/463 312/217 |
| 6,983,946 | B2 | 1/2006 | Sullivan et al. | |
| 7,264,319 | B2 * | 9/2007 | Cheng | E05B 65/462 312/220 |
| 7,712,850 | B2 | 5/2010 | Vasudeva | |
| 7,823,991 | B2 | 11/2010 | Purdy | |
| 8,651,591 | B1 | 2/2014 | Chen et al. | |
| 8,740,010 | B1 | 6/2014 | Page | |
| 9,375,835 | B1 | 6/2016 | Lin | |
| 10,406,673 | B2 | 9/2019 | Shechtman et al. | |
| 10,583,962 | B2 | 3/2020 | Brunner et al. | |
| 10,750,833 | B2 | 8/2020 | Burchia | |
| 10,967,499 | B2 | 4/2021 | Yogev et al. | |
| 11,780,075 | B2 * | 10/2023 | Barton | B25H 3/028 206/372 |
| 12,005,565 | B2 * | 6/2024 | Dick | B25H 3/025 |
| 2002/0027403 | A1 | 3/2002 | Vasudeva | |
| 2002/0040880 | A1 | 4/2002 | Vasudeva | |
| 2003/0139080 | A1 | 7/2003 | Lafragette et al. | |
| 2004/0012314 | A1 | 1/2004 | Hay et al. | |
| 2004/0119383 | A1 | 6/2004 | Haworth et al. | |
| 2006/0132005 | A1 | 6/2006 | Cheng | |
| 2006/0220507 | A1 * | 10/2006 | Steele | A47B 47/05 312/330.1 |
| 2007/0138041 | A1 | 6/2007 | Welsh | |
| 2007/0235397 | A1 | 10/2007 | Wannop | |
| 2008/0231150 | A1 | 9/2008 | Grela | |
| 2011/0062841 | A1 | 3/2011 | Penner et al. | |
| 2011/0121695 | A1 | 5/2011 | Purdy | |
| 2011/0260588 | A1 | 10/2011 | Lin | |
| 2012/0326406 | A1 | 12/2012 | Lifshitz et al. | |
| 2013/0127129 | A1 | 5/2013 | Bensman et al. | |
| 2014/0265440 | A1 | 9/2014 | Chen et al. | |
| 2017/0166352 | A1 | 6/2017 | Hoppe et al. | |
| 2019/0225371 | A1 | 7/2019 | Hoppe et al. | |
| 2020/0147781 | A1 | 5/2020 | Squiers et al. | |
| 2020/0165036 | A1 | 5/2020 | Squiers et al. | |
| 2022/0176542 | A1 | 6/2022 | Dick | |
| 2023/0122425 | A1 | 4/2023 | Camp et al. | |
| 2023/0415329 | A1 * | 12/2023 | Barton | A45C 7/0045 |

FOREIGN PATENT DOCUMENTS

| | | | |
|---|---|---|---|
| CN | 2714257 | Y | 8/2005 |
| CN | 2764882 | Y | 3/2006 |
| CN | 1834393 | A | 9/2006 |
| CN | 101876226 | A | 11/2010 |
| CN | 102160715 | A | 8/2011 |
| CN | 202151216 | U | 2/2012 |
| CN | 204826933 | U | 12/2015 |
| DE | 1246625 | | 8/1967 |
| DE | 1253198 | | 10/1967 |
| DE | 1561605 | B2 | 2/1977 |
| DE | 8315030 | U1 | 10/1983 |
| DE | 202014103695 | | 12/2014 |
| EP | 0640308 | A2 | 3/1995 |
| EP | 1724069 | A2 | 11/2006 |
| EP | 2537641 | B1 | 9/2016 |
| EP | 2338650 | B1 | 10/2016 |
| FR | 444660 | A | 10/1912 |
| FR | 659172 | A | 6/1929 |
| FR | 1018661 | A | 1/1953 |
| FR | 2211965 | A7 | 7/1974 |
| GB | 191014102 | A | 10/1910 |
| GB | 472060 | A | 9/1937 |
| GB | 1013202 | A | 12/1965 |
| GB | 2106169 | A | 4/1983 |
| GB | 2211486 | | 7/1989 |
| WO | WO2014/125484 | | 8/2014 |
| WO | WO2017/191628 | | 11/2017 |

OTHER PUBLICATIONS

Exhibit 1001 in Petition for Inter Partes Review of U.S. Pat. No. 11,365,026 Filed Sep. 17, 2024, 66 pages.
Exhibit 1002 in Petition for Inter Partes Review of U.S. Pat. No. 11,365,026 Filed Sep. 17, 2024, 324 pages.
Exhibit 1003 in Petition for Inter Partes Review of U.S. Pat. No. 11,365,026 Filed Sep. 17, 2024, 139 pages.
Exhibit 1004 in Petition for Inter Partes Review of U.S. Pat. No. 11,365,026 Filed Sep. 17, 2024, 17 pages.
Exhibit 1005 in Petition for Inter Partes Review of U.S. Pat. No. 11,365,026 Filed Sep. 17, 2024, 9 pages.
Exhibit 1006 in Petition for Inter Partes Review of U.S. Pat. No. 11,365,026 Filed Sep. 17, 2024, 21 pages.
Exhibit 1007 in Petition for Inter Partes Review of U.S. Pat. No. 11,365,026 Filed Sep. 17, 2024, 16 pages.
Exhibit 1008 in Petition for Inter Partes Review of U.S. Pat. No. 11,365,026 Filed Sep. 17, 2024, 31 pages.
Exhibit 1009 in Petition for Inter Partes Review of U.S. Pat. No. 11,365,026 Filed Sep. 17, 2024, 6 pages.
Exhibit 1010 in Petition for Inter Partes Review of U.S. Pat. No. 11,365,026 Filed Sep. 17, 2024, 4 pages.
Exhibit 1011 in Petition for Inter Partes Review of U.S. Pat. No. 11,365,026 Filed Sep. 17, 2024, 16 pages.
Exhibit 1012 in Petition for Inter Partes Review of U.S. Pat. No. 11,365,026 Filed Sep. 17, 2024, 8 pages.
Exhibit 1013 in Petition for Inter Partes Review of U.S. Pat. No. 11,365,026 Filed Sep. 17, 2024, 19 pages.
Exhibit 1014 in Petition for Inter Partes Review of U.S. Pat. No. 11,365,026 Filed Sep. 17, 2024, 35 pages.
Exhibit 1015 in Petition for Inter Partes Review of U.S. Pat. No. 11,365,026 Filed Sep. 17, 2024, 11 pages.
Exhibit 1016 in Petition for Inter Partes Review of U.S. Pat. No. 11,365,026 Filed Sep. 17, 2024, 193 pages.
Exhibit 1017 in Petition for Inter Partes Review of U.S. Pat. No. 11,365,026 Filed Sep. 17, 2024, 29 pages.
Exhibit 1018 in Petition for Inter Partes Review of U.S. Pat. No. 11,365,026 Filed Sep. 17, 2024, 15 pages.
Exhibit 1019 in Petition for Inter Partes Review of U.S. Pat. No. 11,365,026 Filed Sep. 17, 2024, 19 pages.
Exhibit 1020 in Petition for Inter Partes Review of U.S. Pat. No. 11,365,026 Filed Sep. 17, 2024, 18 pages.
Exhibit 1021 in Petition for Inter Partes Review of U.S. Pat. No. 11,365,026 Filed Sep. 17, 2024, 313 pages.
Exhibit 1030 in Petition for Inter Partes Review of U.S. Pat. No. 11,365,026 Filed Sep. 17, 2024, 95 pages.
Exhibit 1031 in Petition for Inter Partes Review of U.S. Pat. No. 11,365,026 Filed Sep. 17, 2024, 5 pages.
Exhibit 1032 in Petition for Inter Partes Review of U.S. Pat. No. 11,365,026 Filed Sep. 17, 2024, 19 pages.
Inter Partes Review No. 2024-01401, "Petition for Inter Partes Review of U.S. Pat. No. 11,794,952" Filed Sep. 17, 2024, 165 pages.
Exhibit 1001 in Petition for Inter Partes Review of U.S. Pat. No. 11,794,952 Filed Sep. 17, 2024, 67 pages.
Exhibit 1002 Part 1 in Petition for Inter Partes Review of U.S. Pat. No. 11,794,952 Filed Sep. 17, 2024, 227 pages.
Exhibit 1002 Part 2 in Petition for Inter Partes Review of U.S. Pat. No. 11,794,952 Filed Sep. 17, 2024, 278 pages.
Exhibit 1003 in Petition for Inter Partes Review of U.S. Pat. No. 11,794,952 Filed Sep. 17, 2024, 168 pages.
Exhibit 1004 in Petition for Inter Partes Review of U.S. Pat. No. 11,794,952 Filed Sep. 17, 2024, 17 pages.
Exhibit 1005 in Petition for Inter Partes Review of U.S. Pat. No. 11,794,952 Filed Sep. 17, 2024, 9 pages.
Exhibit 1006 in Petition for Inter Partes Review of U.S. Pat. No. 11,794,952 Filed Sep. 17, 2024, 21 pages.

(56) References Cited

OTHER PUBLICATIONS

Exhibit 1007 in Petition for Inter Partes Review of U.S. Pat. No. 11,794,952 Filed Sep. 17, 2024, 16 pages.
Exhibit 1008 in Petition for Inter Partes Review of U.S. Pat. No. 11,794,952 Filed Sep. 17, 2024, 31 pages.
Exhibit 1009 in Petition for Inter Partes Review of U.S. Pat. No. 11,794,952 Filed Sep. 17, 2024, 6 pages.
Exhibit 1010 in Petition for Inter Partes Review of U.S. Pat. No. 11,794,952 Filed Sep. 17, 2024, 4 pages.
Exhibit 1011 in Petition for Inter Partes Review of U.S. Pat. No. 11,794,952 Filed Sep. 17, 2024, 16 pages.
Exhibit 1012 in Petition for Inter Partes Review of U.S. Pat. No. 11,794,952 Filed Sep. 17, 2024, 8 pages.
Exhibit 1013 in Petition for Inter Partes Review of U.S. Pat. No. 11,794,952 Filed Sep. 17, 2024, 19 pages.
Exhibit 1014 in Petition for Inter Partes Review of U.S. Pat. No. 11,794,952 Filed Sep. 17, 2024, 35 pages.
Exhibit 1015 in Petition for Inter Partes Review of U.S. Pat. No. 11,794,952 Filed Sep. 17, 2024, 11 pages.
Exhibit 1016 in Petition for Inter Partes Review of U.S. Pat. No. 11,794,952 Filed Sep. 17, 2024, 193 pages.
Exhibit 1017 in Petition for Inter Partes Review of U.S. Pat. No. 11,794,952 Filed Sep. 17, 2024, 29 pages.
Exhibit 1018 in Petition for Inter Partes Review of U.S. Pat. No. 11,794,952 Filed Sep. 17, 2024, 15 pages.
Exhibit 1019 in Petition for Inter Partes Review of U.S. Pat. No. 11,794,952 Filed Sep. 17, 2024, 19 pages.
Exhibit 1020 in Petition for Inter Partes Review of U.S. Pat. No. 11,794,952 Filed Sep. 17, 2024, 18 pages.
Exhibit 1021 in Petition for Inter Partes Review of U.S. Pat. No. 11,794,952 Filed Sep. 17, 2024, 313 pages.
Exhibit 1022 in Petition for Inter Partes Review of U.S. Pat. No. 11,794,952 Filed Sep. 17, 2024, 324 pages.
Exhibit 1023 in Petition for Inter Partes Review of U.S. Pat. No. 11,794,952 Filed Sep. 17, 2024, 5 pages.
Exhibit 1024 in Petition for Inter Partes Review of U.S. Pat. No. 11,794,952 Filed Sep. 17, 2024, 7 pages.
Exhibit 1025 in Petition for Inter Partes Review of U.S. Pat. No. 11,794,952 Filed Sep. 17, 2024, 15 pages.
Exhibit 1026 in Petition for Inter Partes Review of U.S. Pat. No. 11,794,952 Filed Sep. 17, 2024, 37 pages.
Exhibit 1027 in Petition for Inter Partes Review of U.S. Pat. No. 11,794,952 Filed Sep. 17, 2024, 7 pages.
Exhibit 1028 in Petition for Inter Partes Review of U.S. Pat. No. 11,794,952 Filed Sep. 17, 2024, 33 pages.
Exhibit 1030 in Petition for Inter Partes Review of U.S. Pat. No. 11,794,952 Filed Sep. 17, 2024, 95 pages.
Exhibit 1031 in Petition for Inter Partes Review of U.S. Pat. No. 11,794,952 Filed Sep. 17, 2024, 5 pages.
Exhibit 1032 in Petition for Inter Partes Review of U.S. Pat. No. 11,794,952 Filed Sep. 17, 2024, 60 pages.
International Search Report and Written Opinion for International Application No. PCT/US2023/060892, dated May 9, 2023, 13 pages.

* cited by examiner

MODULAR STORAGE UNIT INCLUDING SUB-UNITS

CROSS-REFERENCE TO RELATED PATENT APPLICATIONS

The present application is a continuation of International Application No. PCT/US2023/060892, filed Jan. 19, 2023, which claims the benefit of and priority to U.S. Provisional Application No. 63/301,721, filed on Jan. 21, 2022, each of which is incorporated herein by reference in its entirety.

BACKGROUND OF THE INVENTION

The present disclosure is directed generally to storage compartments, units and/or devices. The present disclosure is also directed at modular systems, such as modular storage systems. The present disclosure relates specifically to modular storage units couplable within a modular system and that include sub-units that slide outward along a path that provides improved accessibility to an internal storage compartment.

Modular systems, such as modular storage systems, include utility modules with a variety of functions. Storage units are generally used to store and/or organize tools, equipment and other objects. Modular storage units include one or more containers that actuate between stowed positions in which the storage compartment is not accessible, and one or more open positions in which the tools, equipment and other objects can be retrieved.

SUMMARY OF THE INVENTION

One embodiment of the invention relates to a storage device including a housing defining a front surface and an opposing rear surface, a plurality of male couplers extending from the rear surface, a plurality of female couplers extending from the front surface, a plurality of containers each defining a storage compartment, the plurality of containers each slidably coupled to the housing, and a locking mechanism coupled to the housing. Each of the male couplers are configured for arresting engagement with an upper surface of a first utility module, and each of the female couplers are configured for arresting engagement with a lower surface of the first utility module opposite the upper surface. The locking mechanism is configured to secure the plurality of containers within the housing when the locking mechanism is arranged in a locked configuration.

Another embodiment of the invention relates to a storage device including a housing defining a front surface and an opposing rear surface, a plurality of male couplers extending from the rear surface, a plurality of containers each defining a storage compartment, the plurality of containers each slidably coupled to the housing, and a locking mechanism coupled to the housing. The plurality of male couplers each include a body extending from the rear surface, a first tongue, and a second tongue, the first tongue and the second tongue both extending from the body and both offset from and above the rear surface. The first tongue defines a first channel between the rear surface and the first tongue, and the second tongue defines a second channel between the rear surface and the second tongue. The first channel and second channel each extend on opposing sides of the body, and each channel includes a front open end and a back closed end. The locking mechanism is configured to secure the plurality of containers within the housing when the locking mechanism is arranged in a locked configuration.

Another embodiment of the invention relates to a storage device including a housing defining a front surface and an opposing rear surface, a plurality of female couplers extending from the front surface, a plurality of containers each defining a storage compartment, the plurality of containers each slidably coupled to the housing, and a locking mechanism coupled to the housing. Each of the plurality of female couplers include a recessed surface, a front wall, a back wall, a first sidewall, and a first rib extending above and offset from the recessed surface. The back wall, the first sidewall, and the front wall extend upward from the recessed surface. The first rib extends from the back wall towards the front wall and extends from the first sidewall. The plurality of containers each define a storage compartment, and the plurality of containers are each slidably coupled to the housing. The locking mechanism is coupled to the housing. The locking mechanism is configured to secure the plurality of containers within the housing when the locking mechanism is arranged in a locked configuration.

Another embodiment of the invention relates to a storage device including a housing, a plurality of male couplers, a plurality of female couplers, a plurality of containers slidable with respect to the housing, and a locking mechanism. The housing defines a front surface and an opposing rear surface. The plurality of male couplers extend from the rear surface, and each of the male couplers are configured for arresting engagement with an upper surface of a first utility module. The plurality of female couplers extend from the front surface, and each of the female couplers are configured for arresting engagement with a lower surface of the first utility module. The plurality of containers each define a storage compartment, and each of the plurality of containers are slidably engaged with the housing such that the containers actuate between a retracted and an extended position with respect to the housing. The locking mechanism is coupled to the housing and is configured to secure the plurality of containers within the housing when the locking mechanism is arranged in the locked configuration.

In various embodiments, the plurality of containers each include a protrusion extending from the container, the storage device includes a slot configured to receive the protrusion, and the protrusion slides within the slot contemporaneously with the container sliding with respect to the housing. In various embodiments, the slot extends laterally from a rear portion to a front portion. When the storage device is arranged in the upright orientation, the front portion is lower than the rear portion.

In various embodiments, the storage device includes a first bottom wall positioned below a first container of the plurality of containers when the first container is retracted within the housing, and the first container includes a bottom wall defining a recessed portion configured to receive the first bottom wall when the first container is extended from the housing and the top of the first container slides and tilts forward.

In various embodiments, each male coupler of the plurality of male couplers includes a first tongue and a second tongue. The first tongue extends in a first direction above and offset from the rear surface. The second tongue extends in a second direction opposite the first direction, and the second tongue extends above and is offset from the rear surface. In various embodiments, each of the female couplers of the plurality of female couplers includes a first rib extending in a first direction. The first rib extends above and is offset from the front surface.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
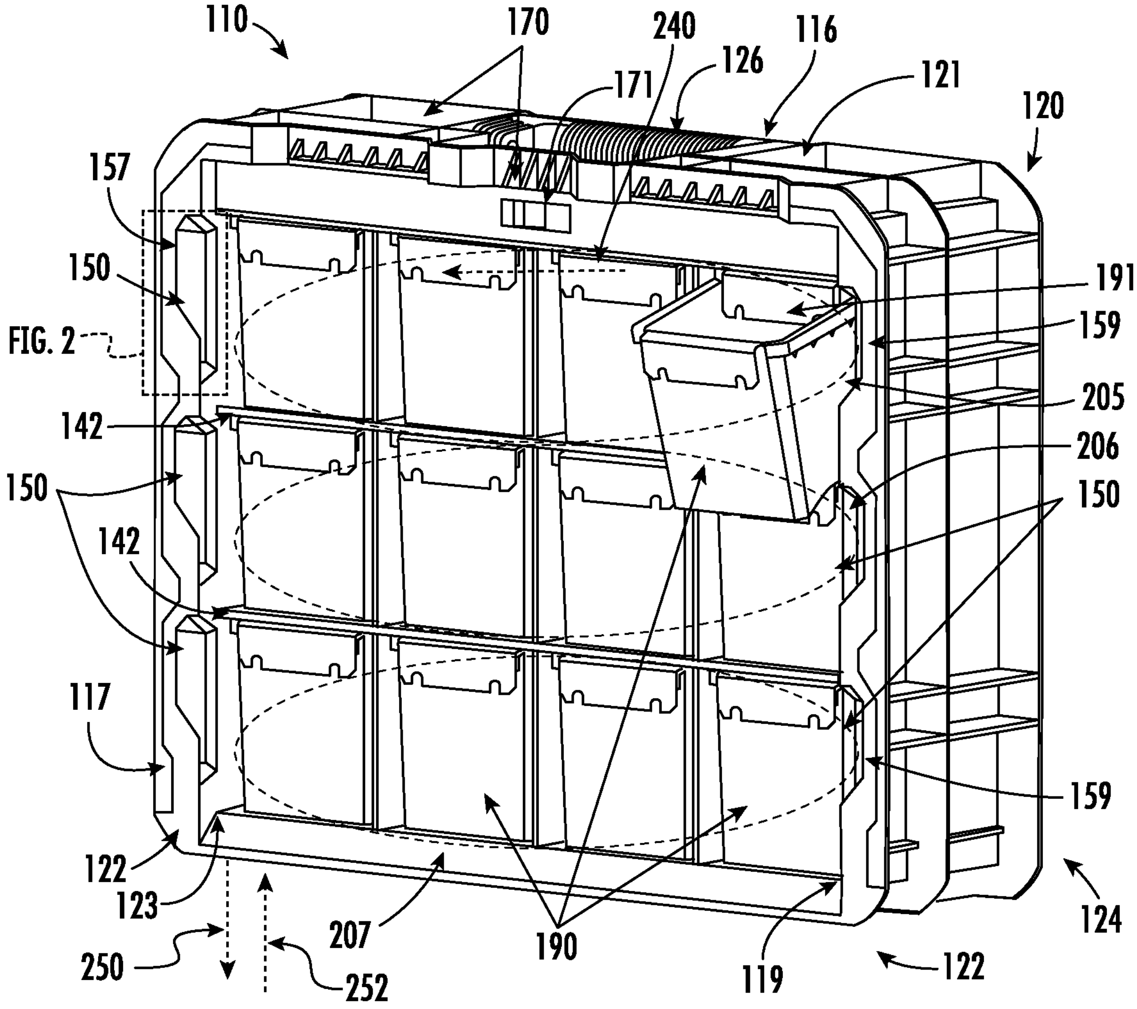
FIG. 1 is a perspective view of a storage device, according to an exemplary embodiment.
Figure 2:
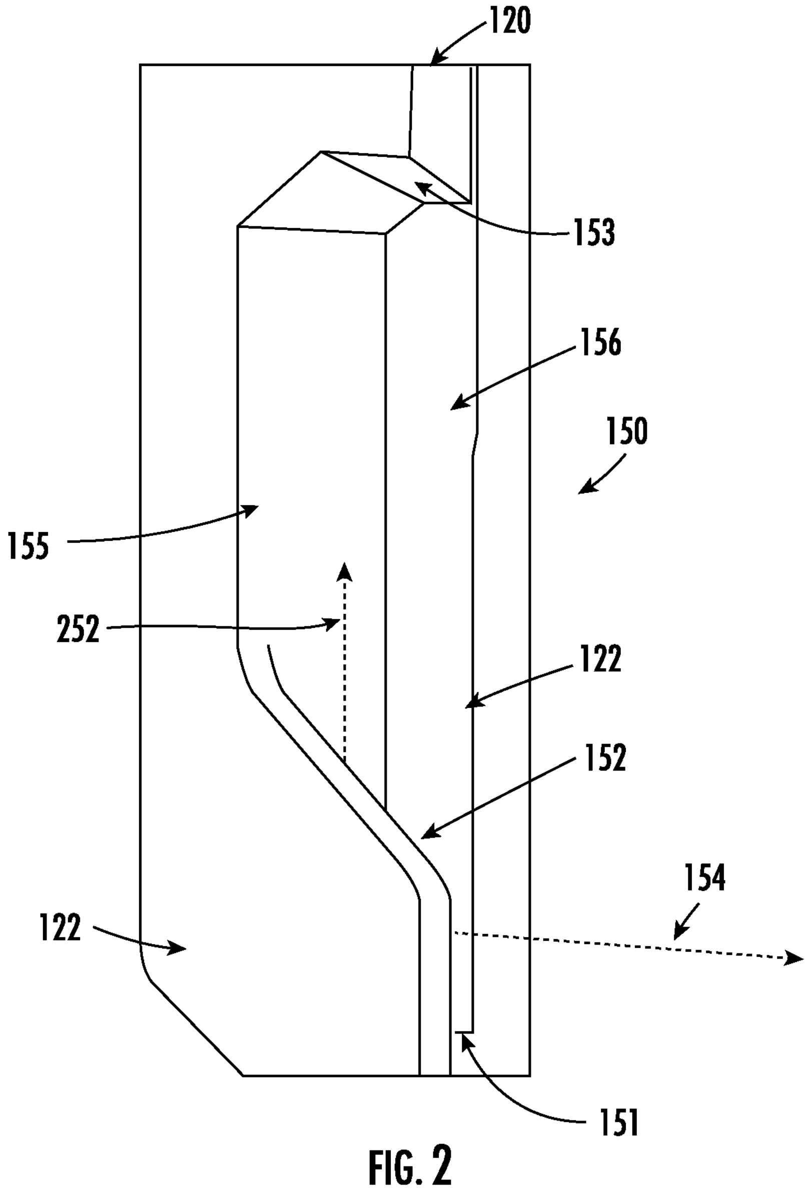
FIG. 2 is a detailed perspective view of the storage device of FIG. 1, according to an exemplary embodiment.

Referring generally to the figures, various embodiments of a storage compartment, device, and/or unit are shown. In various embodiments, a storage device includes coupling elements that couple the storage device within a modular system, such as female couplers on a first side of the storage device and male couplers on an opposing second side of the storage device. The storage device couples within a modular storage system and provides one or more compartments that are actuated between being locked within the storage device and having the contents of the compartments be accessible.

In various embodiments, the storage device includes containers slidably engaged with the housing along a path angled downward, one or more female couplers at a front of the housing, such as a plurality of female couplers each including a rib extending above a recessed surface, and one or more male couplers at a rear of the housing, such as a plurality of male couplers each including a body and tongues extending from the body above and offset from a surface the respective male coupler is extending from, the female couplers and male couplers configured to couple to opposing sides of a utility module. In various embodiments, the one or more portions of female couplers are arranged along opposing sides of the front opening of the housing through which the containers slidably extend. Applicant has observed that the combination and configuration of the male couplers, female couplers, and/or the sliding path of the containers provides a storage device that can be integrated within a modular system and with contents that actuate between being easily accessible and locked within the storage device.

In various embodiments compartments within the storage device actuate from a stowed position in which the compartments are fully and/or mostly received within the housing and an forward/extended position in which the compartments extend partially past a front of the housing. When extended forward, the compartment slides forward to expose the upper opening of the storage compartment, thereby allowing easier access to the storage compartment. The storage device includes a locking mechanism to secure the compartments within the storage device, such as for when the storage device is being moved.

Referring to FIG. 1-4, a container, unit and/or device, shown as storage device 110, is shown according to an exemplary embodiment. Storage device 110 includes one or more containers 190 that define a storage compartment 191 within the container 190. Containers 190 are slidably coupled to housing 120. When storage device 110 is positioned in the upright orientation (FIG. 1), containers 190 are laterally slidable with respect to housing 120 to actuate containers 190 between a retracted configuration and an extended configuration, and the path is angled downward to position upper opening 194 of container 190 at an angle so storage compartment 191 is accessible.

When containers 190 actuate from the retracted configuration to the extended configuration, containers 190 moves in direction 240 with respect to housing 120. When female couplers 150 couple storage device 110 to another unit (e.g., a utility module), storage device 110 moves in direction 252 with respect to the utility module. When male couplers 160 on the rear of housing 120 (see FIGS. 3-4) couple storage device 110 to another unit (e.g., a utility module), storage device 110 moves in direction 250 with respect to the utility module. In various embodiments, direction 250 is parallel to and opposite direction 252. In various embodiments, direction 240 is perpendicular to direction 250 and/or direction 252.

Storage device 110 includes housing 120 that defines a front surface 122 and an opposing rear surface 124, the front surface 122 defining an opening 123 through which the containers 190 extend when the containers are in the extended configuration. Handle 126 is coupled to housing 120 (e.g., a top 121 of the housing 120, such as upper surface 116), such as pivotally coupled.

Storage device 110 includes locking mechanism 170 coupled to the housing 120, the locking mechanism 170 configured to secure the plurality of containers 190 within the housing 120 when the locking mechanism 170 is arranged in a locked configuration. Storage device 110 includes user interface 171 for a user to actuate locking mechanism 170. As will be explained, the locking mechanism 170 is configured to restrain the containers 190 within the housing 120 when the locking mechanism 170 is in the locked configuration.

Storage device 110 can also be oriented horizontally (e.g., rotated so that rear surface 124 is placed against the floor). Orienting storage device 110 horizontally facilitates coupling storage device 110 within a modular system.

In use, storage device 110 is coupled within a modular system (e.g., while storage device 110 is horizontally oriented) and then transported to a destination, such as a construction worksite. Storage device 110 is decoupled from the modular system and arranged in an upright orientation (FIG. 1). The locking mechanism 170 that restrains containers 190 within housing 120 is transitioned to the unlocked configuration, and subsequently contents of containers 190 can be accessed. To move storage device 110, containers 190 are slid within housing 120 and the locking mechanism 170 is transitioned to the locked configuration, thereby securing containers 190 within housing 120. In this configuration, storage device 110 can be reoriented to other positions without containers 190 losing their contents. For example, the storage device 110 can be oriented horizontally and coupled to a modular system for transportation.

Figure 12:
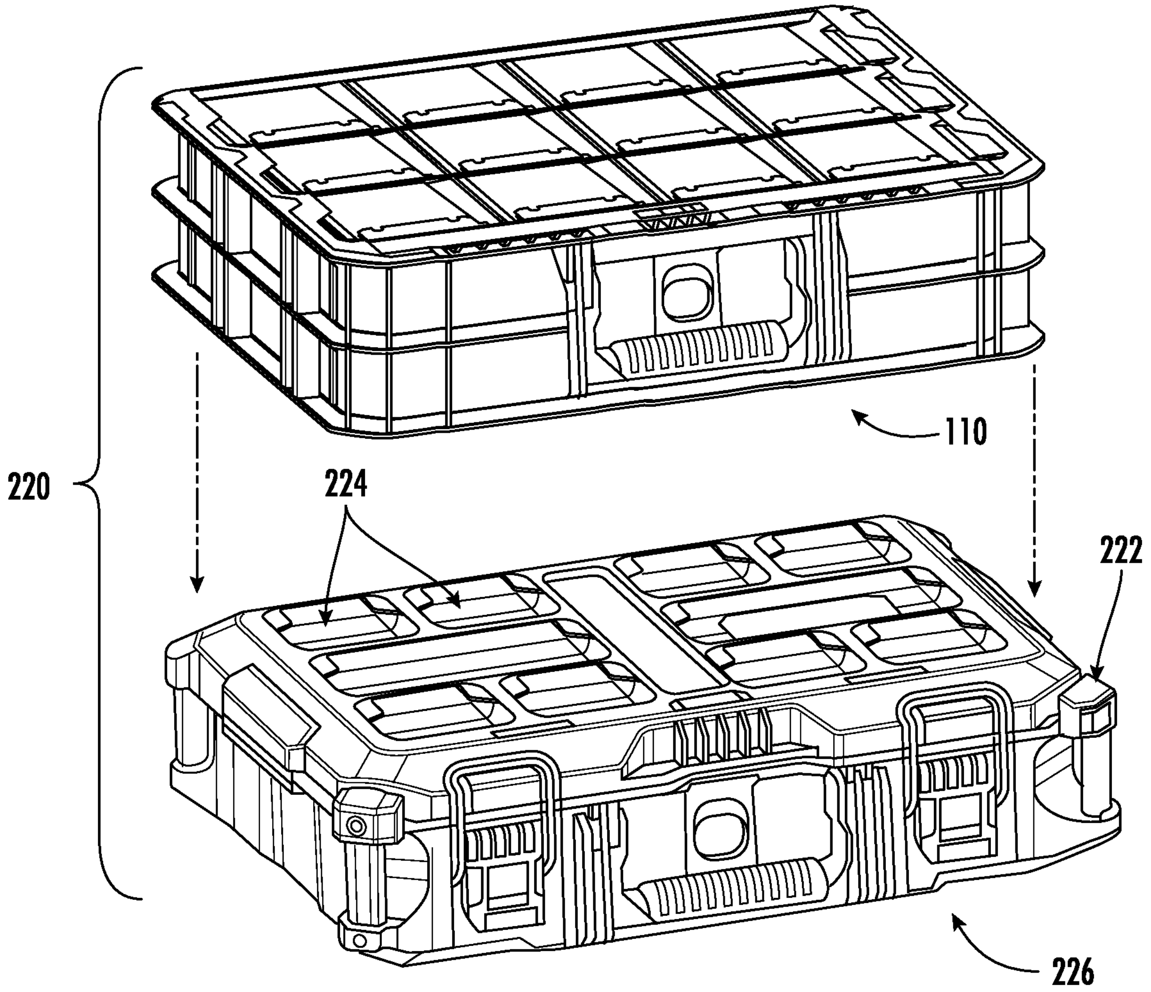
FIG. 12 is a perspective exploded view of a modular system including the storage device of FIG. 1 and a utility module.

Storage device 110 includes one or more female couplers 150 (e.g., a plurality of female couplers 150) that extend from front surface 122 of housing 120, each of the female couplers are configured for arresting engagement with a lower surface of the first utility module opposite the upper surface of the utility module (e.g., lower surface 226 of utility module 222 in FIG. 12). One or more of female couplers 150 include recessed surface 156 and rib 152 extending in direction 154 above and offset from recessed surface 156 of the respective female coupler 150. Each of the female couplers 150 are configured for arresting engagement with a lower surface of a utility module.

In various embodiments, each of the plurality of female couplers 150 includes a recessed surface 156, a front wall 151, a back wall 153, a first sidewall 155, and a first rib 152 extending above and offset from the recessed surface 156. The back wall 153, the first sidewall 155, and the front wall 151 extend upward from the recessed surface 156. The first rib 152 extends from the back wall 153 towards the front wall 151 and extends from the first sidewall 155.

Referring to FIG. 1, a first female coupler (e.g., one of female couplers 157) of the plurality of female couplers 150 are positioned on a left side 117 of the front surface 122 of the housing 120, and a second female coupler (e.g., one of female couplers 159) of the plurality of female couplers 150 are positioned on an opposing right side 119 of the front surface 122 of the housing 120. Storage device 110 includes panel 142 extending horizontally within the housing 120, the panel 142 extending above a first row 207 of the plurality of containers 190 and below a second row 206 of the plurality of containers 190, and a second panel 142 that extends horizontally within the housing 120 above a second row 206 of the plurality of containers 190 and below a first row 205 of the plurality of containers 190.

Figure 3:
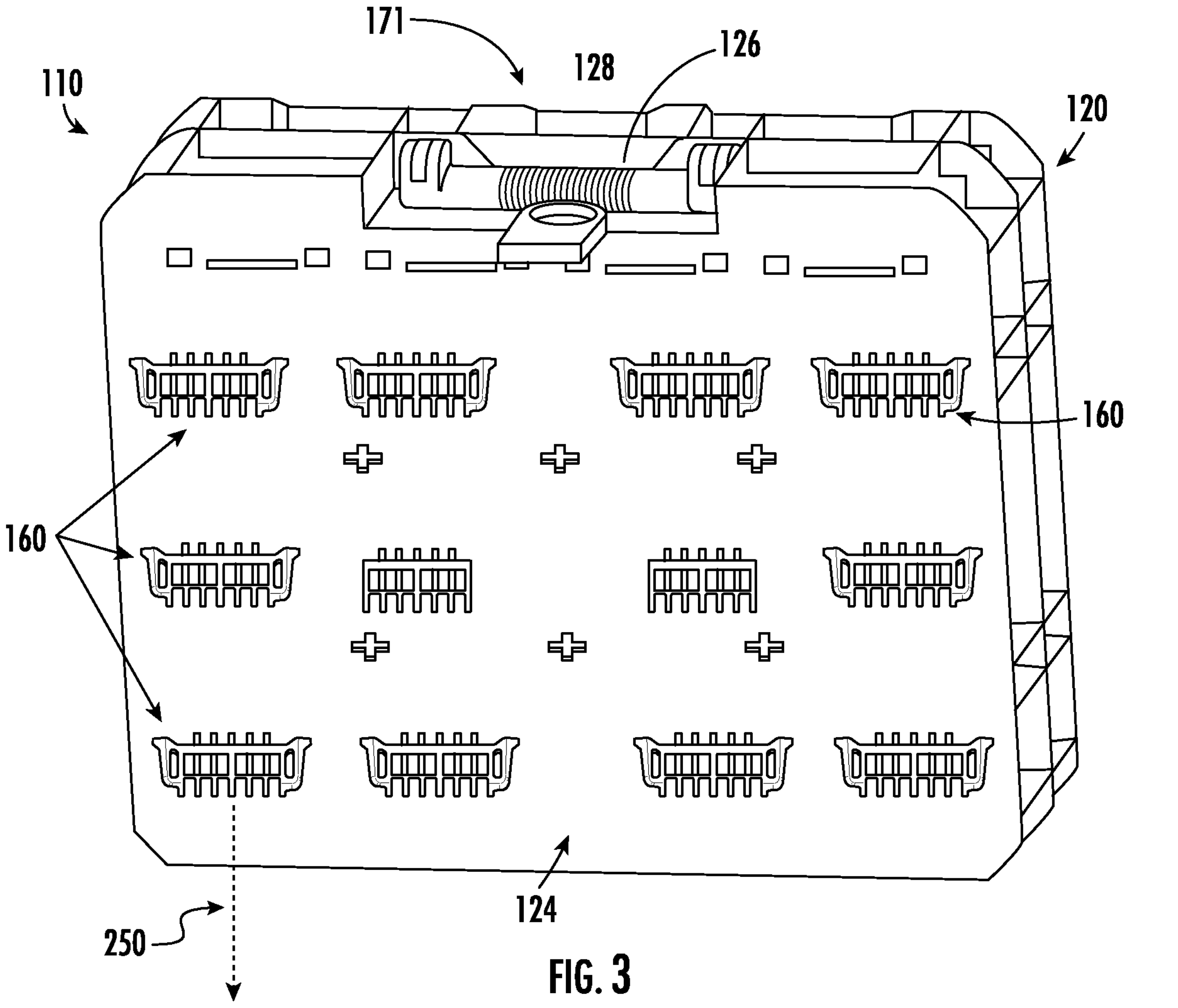
FIG. 3 is a perspective view from behind of the storage device of FIG. 1, according to an exemplary embodiment.
Figure 4:
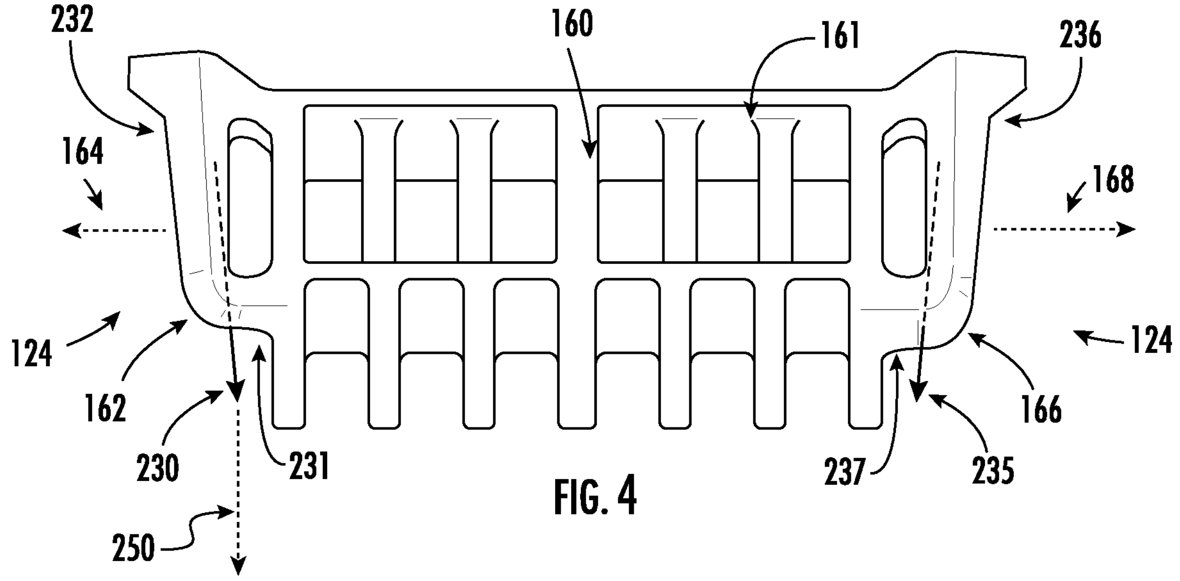
FIG. 4 is a detailed perspective view from behind of the storage device of FIG. 1, according to an exemplary embodiment.
Figure 5:
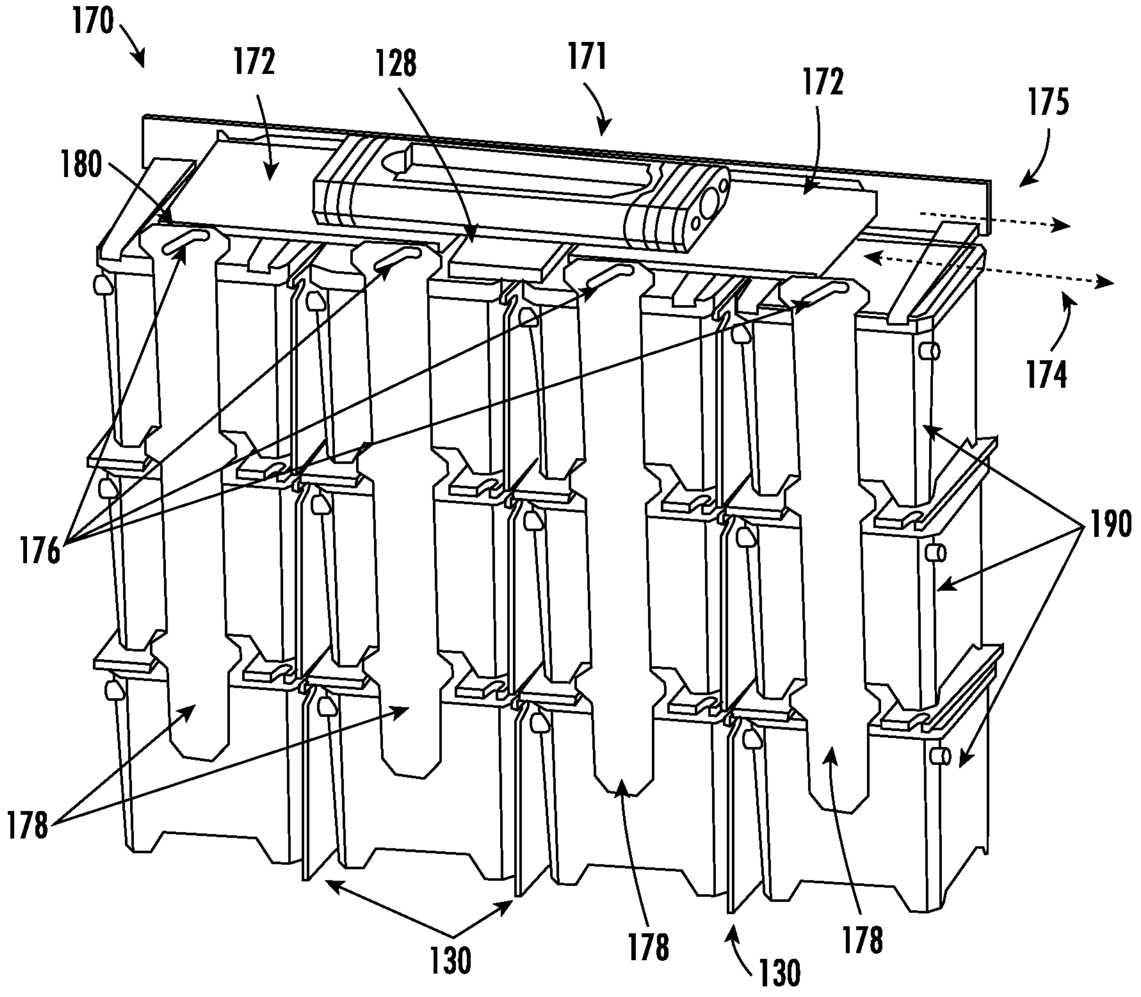
FIG. 5 is a perspective view from behind of a portion of the storage device of FIG. 1, according to an exemplary embodiment.

Referring to FIGS. 3-4, storage device 110 includes one or more of male couplers 160 (e.g., a plurality of male couplers 160) that extend from rear surface 124 of housing 120, and each of the male couplers 160 are configured for arresting engagement with an upper surface of a first utility module (e.g., upper surface 224 of utility module 222 in FIG. 12). Male couplers include a first tongue 162 extending in a first direction 164 offset and above rear surface 124, and a second tongue 166 extending in a second direction 168 opposite the first direction 164. The second tongue 166 is offset and extends above rear surface 124. Each of the male couplers 160 are configured for arresting engagement with an upper surface of a utility module.

The plurality of male couplers 160 each include a body 161 extending from the rear surface 124, a first tongue 162, and a second tongue 166. The first tongue 162 and the second tongue 166 both extend from the body 161 and both are offset from and above the rear surface 124. The first tongue 162 defines a first channel 230 between the rear surface 124 and the first tongue 162, the second tongue 166 defines a second channel 235 between the rear surface 124 and the second tongue 162, the first channel 230 and second channel 235 each extending on opposing sides of the body 161, each channel 230, 235 including a front open end 231, 236 and a back closed end 232, 237, respectively.

Storage device 110 includes latch 128 coupled to housing 120, such as slidably coupled. Latch 128 is configured to provide arresting engagement between storage device 110 and a utility module when the plurality of male couplers 160 are engaged with the utility module (e.g., corresponding female couplers extending from the utility module).

In various embodiments, latch 128 and handle 126 are coupled to a top 121 of housing 120, such as upper surface 116 of top 121 of housing 120. In various embodiments, latch 128 and handle 126 are coupled to top 121 of housing 120 above opening 123 and user interface 171.

In various embodiments, female coupler 150, male coupler 160, and/or latch 128 are compatible with the coupling mechanism(s) described in International Patent International Patent Publication No. WO 2017/191628, which is hereby incorporated by reference in its entirety.

Referring to FIGS. 5-9, various aspects of the locking mechanism 170 of storage device 110 are shown. To facilitate describing locking mechanism 170, housing 120 is not shown in FIGS. 5-9. Locking mechanism 170 is coupled to housing 120. Locking mechanism 170 actuates between a locked configuration and an unlocked configuration. Locking mechanism 170 is configured to secure and/or restrain the plurality of containers 190 within the housing 120 when the locking mechanism 170 is arranged in the locked configuration.

The locking mechanism 170 includes arm 172 that is coupled to user interface 171, such as rigidly coupled to user interface 171. Arm 172 is coupled to housing 120, such as slidably coupled to housing 120. In various embodiments, a user pushes user interface 171 to slide user interface 171 with respect to housing 120, and as a result arm 172 slides with respect to housing 120 along axis 174. For example, arm 172 slides in direction 175 when locking mechanism 170 actuates from the unlocked configuration to the locked configuration.

Storage device 110 includes one or more walls 130 extending between containers 190, such as walls 130 extending vertically within housing 120. As will be explained, walls 130 include a structure, such as slots, that portions of the containers 190 slide within as the containers 190 slide with respect to housing 120.

Arm 172 includes one or more protrusions 176 configured to engage with arms 178. In various embodiments, arms 178 extend vertically to facilitate arms 178 interfacing with containers 190 at different positions (e.g., heights) within housing 120. Arms 178 include an aperture 180 configured to receive and/or interface with protrusions 176 of arm 172.

In use, to lock the storage device 110 the user pushes or pulls user interface 171. User interface 171 then exerts a force on arm 172 to slide arm 172 in direction 175 with respect to housing 120. As a result, arm 178 slides in direction 183 because protrusion 176 of arm 172 interfaces with the angled orientation of aperture 180, thereby biasing arm 178 in direction 183. In various embodiments, aperture 180 extends longitudinally in an angled orientation with respect to gravity when the storage device 110 is arranged in the upright orientation.

Figure 6:
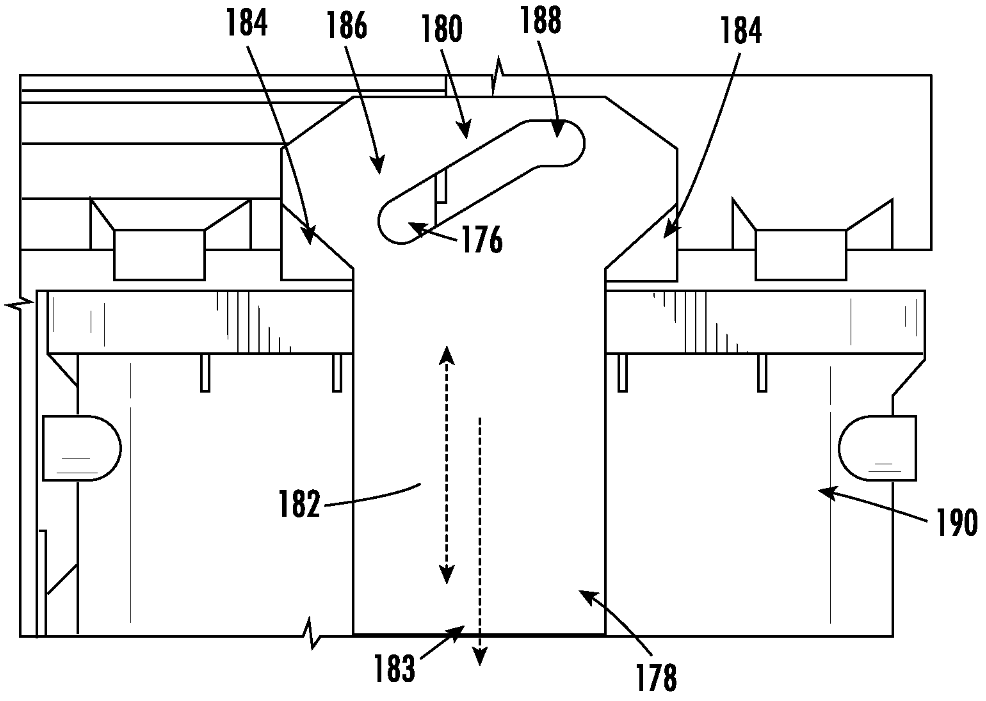
FIG. 6 is a detailed rear view of a portion of the storage device of FIG. 1 shown in an unlocked configuration, according to an exemplary embodiment.
Figure 7:
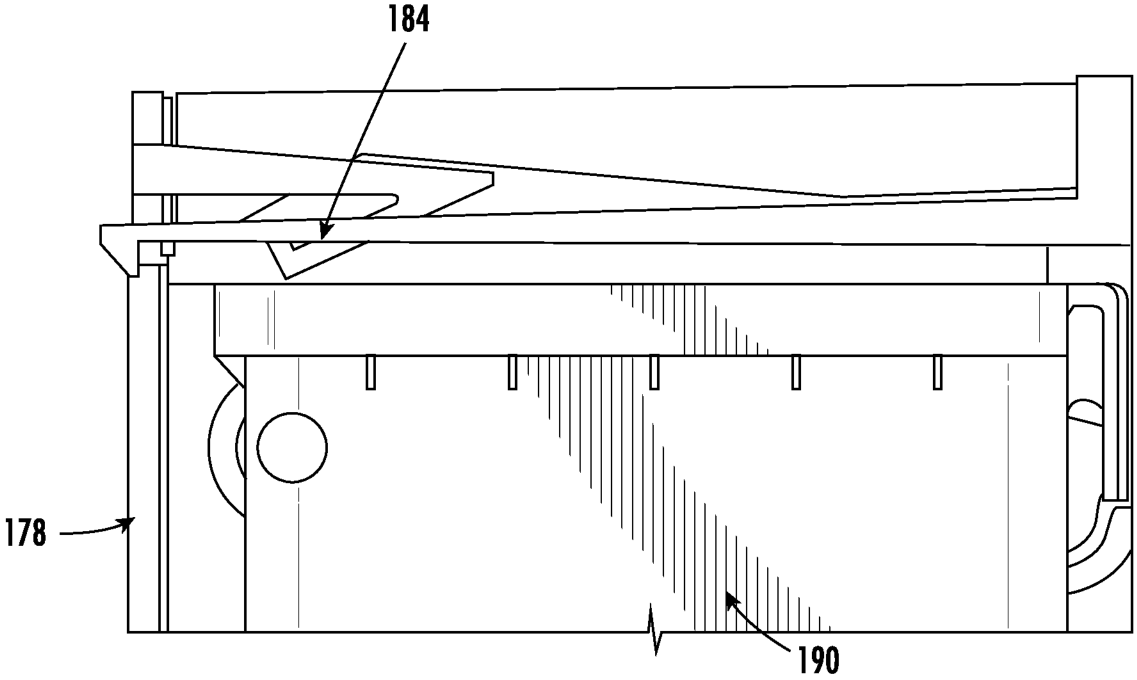
FIG. 7 is a detailed side view of a portion of the storage device of FIG. 1 shown in an unlocked configuration, according to an exemplary embodiment.

Referring to FIGS. 6-7, various aspects of locking mechanism 170 are shown. In particular, FIGS. 6-7 depict locking mechanism 170 arranged in the unlocked configuration.

Arms 178 are coupled to housing 120, such as slidably coupled to housing 120. In various embodiments, arms 178 slide along axis 182 with respect to housing 120 when locking mechanism 170 actuates between the locked configuration and the unlocked configuration. In particular, arm 178 slides in direction 183 along axis 182 when locking mechanism 170 actuates from the unlocked configuration to the locked configuration.

One or more locking elements 184 extend from arms 178. Locking elements 184 are configured to restrain the containers 190 within housing 120 when locking mechanism 170 is arranged in the locked configuration (for example, when storage device 110 is being transported).

When locking mechanism 170 is arranged in the unlocked configuration (FIG. 7), protrusion 176 is positioned at unlocked end 186 of aperture 180 and locking elements 184 are positioned above container 190. As a result, container 190 is permitted to be removed and/or extended from housing 120.

Figure 8:
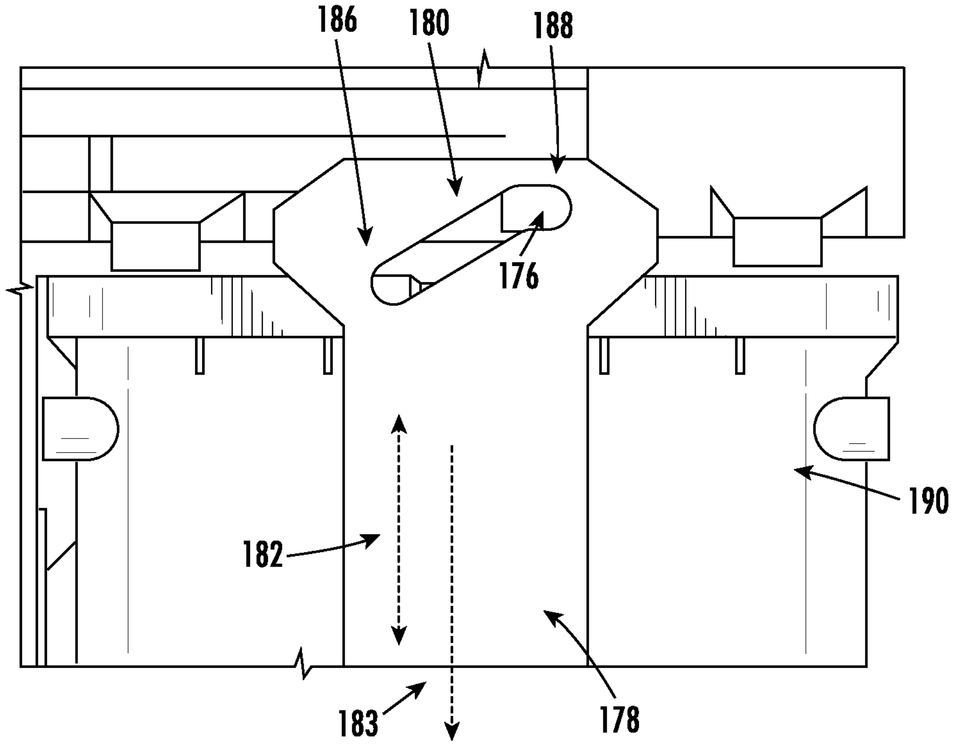
FIG. 8 is a detailed rear view of a portion of the storage device of FIG. 1 shown in a locked configuration, according to an exemplary embodiment.
Figure 9:
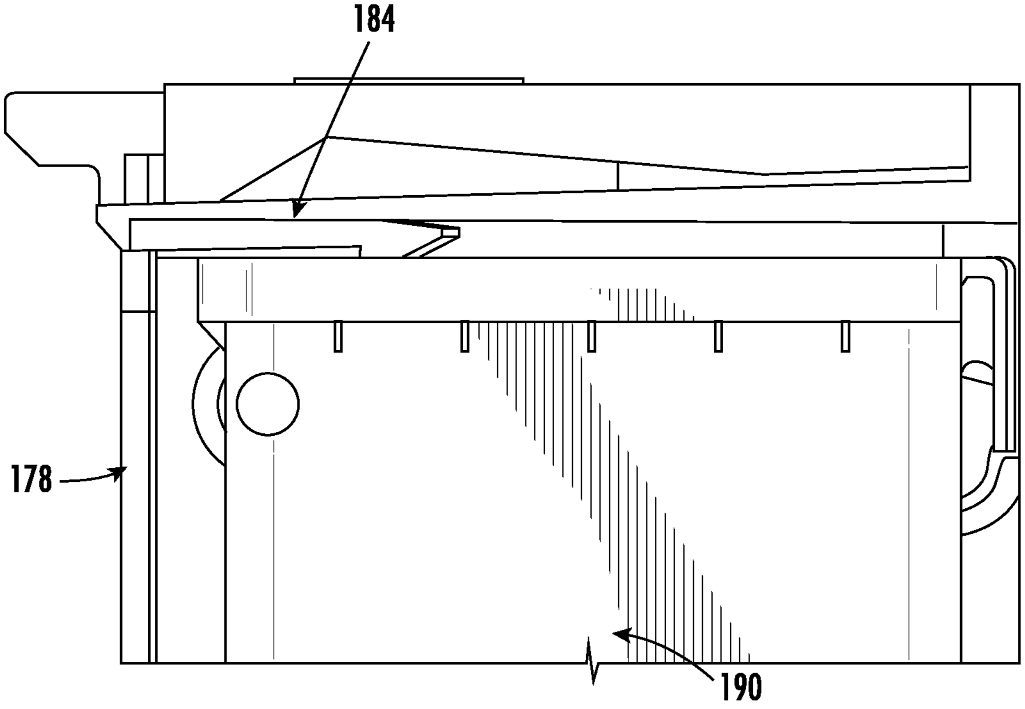
FIG. 9 is a detailed side view of a portion of the storage device of FIG. 1 shown in a locked configuration, according to an exemplary embodiment.

Referring to FIGS. 8-9, various aspects of locking mechanism 170 are shown. In particular, FIGS. 8-9 depict locking mechanism 170 arranged in the locked configuration.

When locking mechanism 170 actuates from the unlocked configuration to the locked configuration, arm 178 slides in direction 183 along axis 182. When locking mechanism 170 is arranged in the locked configuration (FIG. 9), protrusion 176 is positioned at locked end 188 of aperture 180 and locking elements 184 are positioned within container 190. As a result, container 190 is restrained by locking elements 184 from being removed and/or extended from storage device 110.

Figure 10:
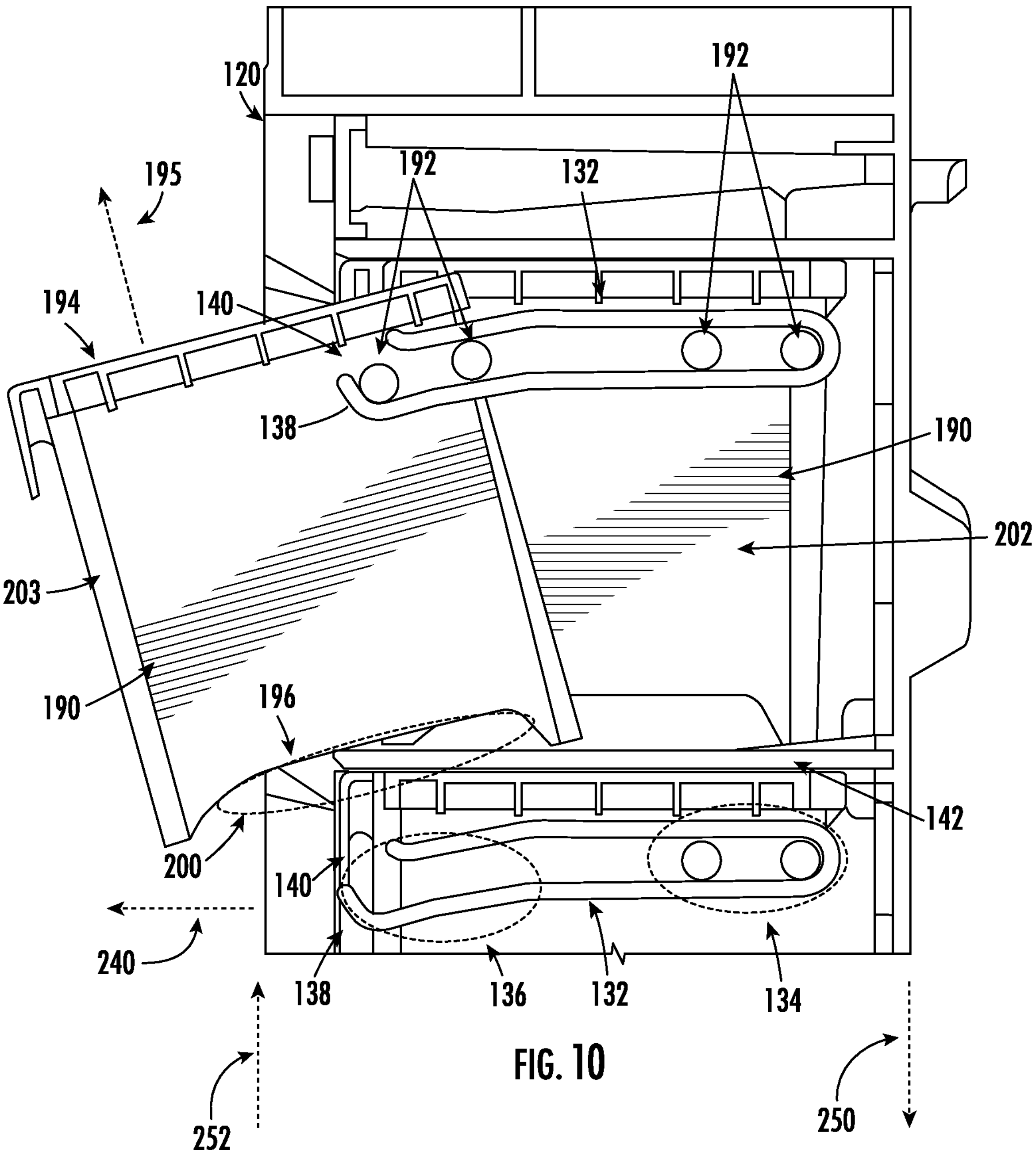
FIG. 10 is a side schematic view of a portion of the storage device of FIG. 1, according to an exemplary embodiment.
Figure 11:
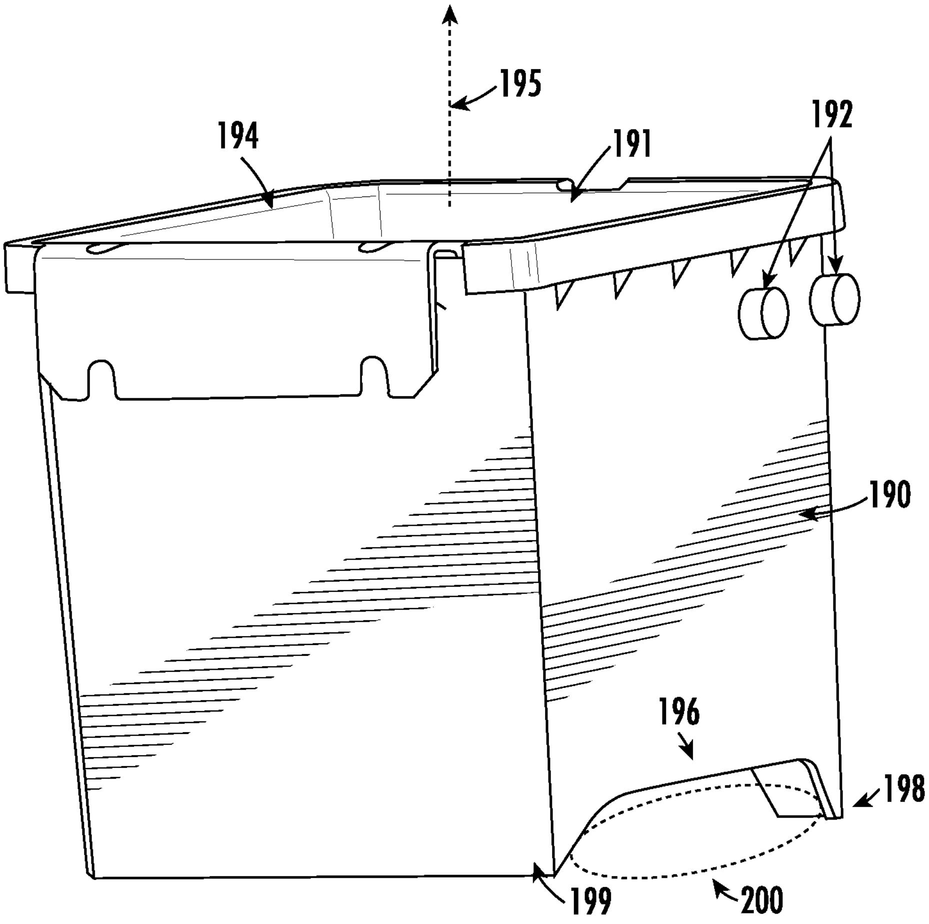
FIG. 11 is a perspective view of a container of the storage device of FIG. 1, according to an exemplary embodiment.

Referring to FIGS. 10-11, various aspects of containers 190 sliding with respect to housing 120 are shown. Containers 190 include one or more protrusions 192 (e.g., a plurality of protrusions 192) extending from container 190, such as two protrusions 192 extending laterally outward from a rear portion of opposing sidewalls of container 190.

Storage device 110 includes a plurality of slots 132 configured to receive the plurality of protrusions 192. Protrusions 192 of container 190 slide within slot 132 contemporaneously with the container 190 sliding with respect to the housing 120. In use, the protrusion 192 slides within the slot 132 contemporaneously with the container 190 sliding with respect to the housing 120. In various embodiments, slots 132 are coupled to interior surface of housing 120 and internal surfaces of side walls 130 of housing 120. In particular, side walls 130 include one or more slots 132, each of which are configured to slidingly engage with protrusions 192 of a container 190 as container is extended and retracted with respect to housing. In various embodiments, slot 132 extends laterally from a rear portion 134 to a front portion 136 that is lower than the rear portion 134 when the storage device 110 is arranged in the upright orientation. In use, to open containers 190, a user slides containers 190 forward in direction 240 with respect to housing 120 along a path angled downward (e.g., front portion 136 is lower than rear portion 134) to position the upper opening 194 of container 190 at an angle, thus making storage compartment 191 accessible.

Container 190 includes upper opening 194 through which storage compartment 191 can be accessed. When container 190 is extended forward from housing 120 (FIG. 10), upper opening 194 faces in direction 195 upward and forward away from housing 120.

In various embodiments, panel 142 is coupled to housing 120, such as rigidly coupled. When container 190 is extended forward from housing 120 (FIG. 10), recess 200 of bottom wall 196 of container 190 receives panel 142 positioned beneath container 190. As can be seen, recess 200 in container 190 permits upper opening 194 of container 190 to be positioned lower than if bottom wall 196 of container 190 did not include recess 200, and therefore contents within storage compartment 191 are easier to access.

Container 190 actuates between the retracted position 202 and the extended position 203. When container 190 is positioned in the retracted position 202, protrusions 192 of container 190 are positioned in rear portion 134 of slot 132. When container 190 is positioned in the extended position 203, protrusions 192 of container 190 are positioned in front portion 136 of slot 132. In various embodiments, rear portion 134 is positioned higher than front portion 136 when storage device is arranged in the upright configuration. When container 190 is positioned in the extended position 203, at least a portion (e.g., at least 50%) of upper opening 194 is positioned in front of front surface 122 housing 120.

To actuate container 190 from the retracted position 202 to the extended position, protrusions 192 are slid forward until at least one of protrusions 192 interfaces with front wall 138 of slot 132. Thus, front wall 138 of slot 132 biases container 190 from being accidentally removed from housing 120. The plurality of slots 132 include aperture 140 through which the plurality of protrusions 192 slide when entering and exiting the respective slots 132. To remove container 190 from housing 120, container 190 is picked up such that protrusions 192 move through aperture 140 of slot 132, thereby decoupling container 190 from housing 120.

Containers 190 are moved in direction 240 relative to housing 220 to actuate containers 190 from the retracted to the extended position. To engage housing 120 with another object (e.g., a utility module) via male couplers 160, housing 120 is moved in direction 250 relative to the other object. To engage housing 120 with another object (e.g., a utility module) via female couplers 150, housing 120 is moved in direction 252 relative to the other object. In various embodiments, direction 250 is parallel to and opposite direction 252. In various embodiments, direction 240 is perpendicular to direction 250 and/or direction 252. When direction 240 is perpendicular to direction 250 and/or direction 252, a user extending a container 190 is less likely to disengage the housing 120 from an object that housing 120 is engaged with and coupled to compared to when direction 240 is not perpendicular to direction 250 and/or direction 252.

Referring to FIG. 11, in various embodiments container 190 includes a first leg 198 extending downward, a second leg 199 extending downward and defining a plane extending laterally along a rear of container 190. First leg 198 and second leg 199 are configured to collectively support container 190. Recess 200 is defined between first leg 198 and second leg 199.

Referring to FIG. 12, various aspects of a modular system 220 including storage device 110 are shown. Modular system 220 includes storage device 110 and utility module 222. Utility module 222 includes an upper surface 224 and an opposing lower surface 226. In various embodiments, utility module is a storage device including a storage compartment. In various embodiments, upper surface 224 of utility module 222 includes a plurality of female couplers that each include two ribs extending above a recessed surface. In various embodiments, lower surface 226 of utility module 222 includes a plurality of male couplers that each include one or two tongues, similar to the male couplers shown extending from storage device 110 in FIG. 3.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A storage device comprising:

a housing defining a front surface and an opposing rear surface;

a plurality of male couplers extending from the rear surface, each of the male couplers are configured for arresting engagement with an upper surface of a first utility module;

a plurality of female couplers extending from the front surface, each of the female couplers are configured for arresting engagement with a lower surface of the first utility module opposite the upper surface;

a plurality of containers each defining a storage compartment, the plurality of containers each slidably coupled to the housing;

a locking mechanism slidably coupled to the housing, the locking mechanism configured to secure the plurality of containers within the housing when the locking mechanism is arranged in a locked configuration; and a handle coupled to a top of the housing, wherein the locking mechanism is positioned between the plurality of containers and the top of the housing.

2. The storage device of claim 1, each male coupler of the plurality of male couplers comprising a first tongue extending in a first direction, the first tongue extending above and offset from the rear surface, and a second tongue extending in a second direction opposite the first direction, the second tongue extending above and offset from the rear surface.

3. The storage device of claim 2, each of the female couplers of the plurality of female couplers comprising a recessed surface and a first rib extending in a first direction, the first rib extending above and offset from the recessed surface.

4. The storage device of claim 2, a first female coupler of the plurality of female couplers positioned on a left side of the front surface of the housing, and a second female coupler of the plurality of female couplers positioned on an opposing right side of the front surface of the housing.

5. The storage device of claim 1, each of the female couplers of the plurality of female couplers comprising a first rib extending in a first direction, the first rib extending above and offset from the front surface.

6. The storage device of claim 5, a first female coupler of the plurality of female couplers positioned on a left side of the front surface of the housing, and a second female coupler of the plurality of female couplers positioned on an opposing right side of the front surface of the housing.

7. The storage device of claim 1, comprising a panel extending horizontally within the housing, the panel extending above a first row of the plurality of containers and below a second row of the plurality of containers.

8. The storage device of claim 1, comprising a latch coupled to the housing and configured to provide arresting engagement between the storage device and the first utility module when the plurality of male couplers are engaged with the first utility module.

9. The storage device of claim 1, the plurality of containers each comprising a plurality of protrusions extending from the respective container, the storage device comprising a plurality of slots configured to receive the plurality of protrusions, wherein the plurality of protrusions slide within the plurality of slots contemporaneously with the respective container sliding with respect to the housing.

10. The storage device of claim 9, wherein the plurality of slots comprise an aperture through which the plurality of protrusions slide when entering and exiting the respective slots.

11. The storage device of claim 1, wherein when the plurality of containers are positioned in an extended position, at least 50% of an upper opening of the respective container is positioned in front of the front surface of the housing.

12. A storage device comprising:

a housing defining a front surface, an opposing rear surface, and an upper surface extending between and connecting the front surface and the rear surface;

a housing axis extending along the upper surface;

a plurality of male couplers extending from the rear surface, the plurality of male couplers each comprising a body extending from the rear surface, a first tongue, and a second tongue, the first tongue and the second tongue both extending from the body and both offset from and above the rear surface, the first tongue defining a first channel between the rear surface and the first tongue, the second tongue defining a second channel between the rear surface and the second tongue, the first channel and second channel each extending on opposing sides of the body, each channel comprising a front open end and a back closed end;

a plurality of containers each defining a storage compartment, the plurality of containers each slidably coupled to the housing; and a locking mechanism coupled to the housing, the locking mechanism extending in an orientation of the housing axis, the locking mechanism comprising:

an actuator, the actuator slidable with respect to the front surface of the housing;

an arm coupled to the actuator, the arm slidable with respect to the housing;

wherein the locking mechanism is configured to secure the plurality of containers within the housing when the locking mechanism is arranged in a locked configuration.

13. The storage device of claim 12, comprising a plurality of female couplers extending from the front surface, each of the female couplers are configured for arresting engagement with a lower surface of the first utility module opposite the upper surface, each of the female couplers of the plurality of female couplers comprising a recessed surface and a first rib extending in a first direction, the first rib extending above and offset from the recessed surface.

14. The storage device of claim 12, comprising a latch coupled to the housing and configured to provide arresting engagement between the storage device and the first utility module when the plurality of male couplers are engaged with the first utility module.

15. The storage device of claim 12, comprising:

a panel extending horizontally within the housing, the panel extending above a first row of the plurality of containers and below a second row of the plurality of containers; and a handle coupled to a top of the housing;

wherein when the plurality of containers are positioned in an extended position, at least 50% of an upper opening of the respective container is positioned in front of the front surface of the housing.

16. A storage device comprising:

a housing defining a front surface, an opposing rear surface, and an upper surface extending between and connecting the front surface and the rear surface;

a housing axis extending along the upper surface;

a plurality of female couplers extending from the front surface, each of the plurality of female couplers comprising a recessed surface, a front wall, a back wall, a first sidewall, and a first rib extending above and offset from the recessed surface, the back wall, the first sidewall, and the front wall extending upward from the recessed surface, the first rib extending from the back wall towards the front wall and extending from the first sidewall;

a plurality of containers each defining a storage compartment, the plurality of containers each slidably coupled to the housing; and a locking mechanism slidably coupled to the housing, the locking mechanism extending in an orientation of the housing axis and configured to secure the plurality of containers within the housing when the locking mechanism is arranged in a locked configuration.

17. The storage device of claim 16, comprising a plurality of male couplers extending from the rear surface, each of the male couplers are configured for arresting engagement with an upper surface of a first utility module, each male coupler of the plurality of male couplers comprising a first tongue extending in a first direction, the first tongue extending above and offset from the rear surface, and a second tongue extending in a second direction opposite the first direction, the second tongue extending above and offset from the rear surface.

18. The storage device of claim 16, comprising a handle coupled to a top of the housing, wherein the locking mechanism is positioned between the plurality of containers and the handle.

19. The storage device of claim 16, comprising a first female coupler of the plurality of female couplers positioned on a left side of the front surface of the housing, and a second female coupler of the plurality of female couplers positioned on an opposing right side of the front surface of the housing.

* * * * *